United States Patent
Alkan et al.

(10) Patent No.: US 8,350,641 B2
(45) Date of Patent: Jan. 8, 2013

(54) BAND SELECTIVE ISOLATION BRIDGE FOR SPLITTER

(75) Inventors: Erdogan Alkan, Fayetteville, NY (US); Raymond Palinkas, Canastota, NY (US)

(73) Assignee: John Mezzalingua Associates, Inc., E. Syracuse, NY (US)

( * ) Notice: Subject to any disclaimer, the term of this patent is extended or adjusted under 35 U.S.C. 154(b) by 321 days.

(21) Appl. No.: 12/693,689

(22) Filed: Jan. 26, 2010

(65) Prior Publication Data

US 2011/0181371 A1 Jul. 28, 2011

(51) Int. Cl.
*H01P 5/12* (2006.01)

(52) U.S. Cl. .................... 333/126; 333/129; 333/132

(58) Field of Classification Search .................. 333/126, 333/129, 132
See application file for complete search history.

(56) References Cited

U.S. PATENT DOCUMENTS

| | | |
|---|---|---|
| 3,790,909 A | 2/1974 | LeFevre |
| 3,939,431 A | 2/1976 | Cohlman |
| 4,027,219 A | 5/1977 | Van Alphen et al. |
| 4,306,403 A | 12/1981 | Hubbard et al. |
| 4,344,499 A | 8/1982 | Van der Lely et al. |
| 4,512,033 A | 4/1985 | Schrock |
| 4,520,508 A | 5/1985 | Reichert, Jr. |
| 4,648,123 A | 3/1987 | Schrock |
| 4,677,390 A | 6/1987 | Wagner |
| 4,715,012 A | 12/1987 | Mueller, Jr. |
| 4,961,218 A | 10/1990 | Kiko |
| 4,982,440 A | 1/1991 | Dufresne et al. |
| 5,010,399 A | 4/1991 | Goodman et al. |
| 5,126,840 A | 6/1992 | Dufresne et al. |
| 5,214,505 A | 5/1993 | Rabowsky et al. |
| 5,231,660 A | 7/1993 | West, Jr. |
| 5,369,642 A | 11/1994 | Shioka et al. |

(Continued)

FOREIGN PATENT DOCUMENTS

JP 55-080989 A 6/1980
(Continued)

OTHER PUBLICATIONS

U.S. Appl. No. 13/245,510, filed Sep. 26, 2011, Wells.
(Continued)

*Primary Examiner* — Robert Pascal
*Assistant Examiner* — Kimberly Glenn
(74) *Attorney, Agent, or Firm* — Schmeiser, Olsen & Watts, LLP (57) ABSTRACT

A splitter device includes a first splitter comprising an input leg coupled to a provider content input port, a first output leg, and a second output leg. The provider content input port is configured to receive a downstream-propagating provider bandwidth. The splitter device further includes a first conductive path coupled to the first output leg of the first splitter, and a second conductive path coupled to the second output leg of the first splitter. The splitter device further includes a second splitter having an input leg coupled to a first home network bandwidth, a first output leg coupled to the first conductive path, and a second output leg. The splitter device further includes a third splitter having an input leg coupled to a second home network bandwidth, a first output leg coupled to the second conductive path, and a second output leg. The splitter device further includes a bridge circuit operatively coupled between the first conductive path and the second conductive path. The bridge circuit is configured to propagate a home network bandwidth from the first user port to the second user port and isolate the provider bandwidth from the home network bandwidth.

32 Claims, 8 Drawing Sheets

U.S. PATENT DOCUMENTS

| | | | |
|---|---|---|---|
| 5,485,630 | A | 1/1996 | Lee et al. |
| 5,548,255 | A | 8/1996 | Spielman |
| 5,557,319 | A | 9/1996 | Gurusami et al. |
| 5,557,510 | A | 9/1996 | McIntyre et al. |
| 5,719,792 | A | 2/1998 | Bush |
| 5,740,044 | A | 4/1998 | Ehrenhardt et al. |
| 5,745,836 | A | 4/1998 | Williams |
| 5,815,794 | A | 9/1998 | Williams |
| 5,818,825 | A | 10/1998 | Corrigan et al. |
| 5,839,052 | A | 11/1998 | Dean et al. |
| 5,893,024 | A | 4/1999 | Sanders et al. |
| 5,937,330 | A | 8/1999 | Vince et al. |
| 5,950,111 | A | 9/1999 | Georger et al. |
| 5,970,053 | A | 10/1999 | Schick et al. |
| 6,012,271 | A | 1/2000 | Wilkens et al. |
| 6,014,547 | A | 1/2000 | Caporizzo et al. |
| 6,049,693 | A | 4/2000 | Baran et al. |
| 6,069,960 | A | 5/2000 | Mizukami et al. |
| 6,094,211 | A | 7/2000 | Baran et al. |
| 6,101,932 | A | 8/2000 | Wilkens |
| 6,128,040 | A | 10/2000 | Shinbori et al. |
| 6,129,187 | A | 10/2000 | Bellanger et al. |
| 6,169,569 | B1 | 1/2001 | Widmer et al. |
| 6,173,225 | B1 | 1/2001 | Stelzle et al. |
| 6,185,432 | B1 | 2/2001 | Vembu |
| 6,205,138 | B1 | 3/2001 | Nihal et al. |
| 6,348,837 | B1 | 2/2002 | Ibelings |
| 6,348,955 | B1 | 2/2002 | Tait |
| 6,373,349 | B2 | 4/2002 | Gilbert |
| 6,377,316 | B1 | 4/2002 | Mycynek et al. |
| 6,388,539 | B1 | 5/2002 | Rice |
| 6,425,132 | B1 | 7/2002 | Chappell |
| 6,430,904 | B1 | 8/2002 | Coers et al. |
| 6,495,998 | B1 | 12/2002 | Terreault |
| 6,498,925 | B1 | 12/2002 | Tauchi |
| 6,510,152 | B1 | 1/2003 | Gerszberg et al. |
| 6,546,705 | B2 | 4/2003 | Scarlett et al. |
| 6,560,778 | B1 | 5/2003 | Hasegawa |
| 6,570,928 | B1 | 5/2003 | Shibata |
| 6,587,012 | B1 | 7/2003 | Farmer et al. |
| 6,594,827 | B1 | 7/2003 | Pennings |
| 6,622,304 | B1 | 9/2003 | Carhart |
| 6,640,338 | B1 | 10/2003 | Shibata |
| 6,678,893 | B1 | 1/2004 | Jung |
| 6,683,513 | B2 | 1/2004 | Shamsaifar et al. |
| 6,725,462 | B1 | 4/2004 | Kaplan |
| 6,728,968 | B1 | 4/2004 | Abe et al. |
| 6,757,910 | B1 | 6/2004 | Bianu |
| 6,758,292 | B2 | 7/2004 | Shoemaker |
| 6,804,828 | B1 | 10/2004 | Shibata |
| 6,843,044 | B2 | 1/2005 | Clauss |
| 6,845,232 | B2 | 1/2005 | Darabi |
| 6,868,552 | B1 | 3/2005 | Masuda et al. |
| 6,877,166 | B1 | 4/2005 | Roeck et al. |
| 6,915,530 | B1 | 7/2005 | Kauffman et al. |
| 6,920,614 | B1 | 7/2005 | Schindler et al. |
| 6,928,175 | B1 | 8/2005 | Bader et al. |
| 6,942,595 | B2 | 9/2005 | Hrazdera |
| 7,003,275 | B1 | 2/2006 | Petrovic |
| 7,029,293 | B2 | 4/2006 | Shapson et al. |
| 7,039,432 | B2 | 5/2006 | Strater et al. |
| 7,048,106 | B2 | 5/2006 | Hou |
| 7,127,734 | B1 | 10/2006 | Amit |
| 7,162,731 | B2 | 1/2007 | Reidhead et al. |
| 7,254,827 | B1 | 8/2007 | Terreault |
| 7,283,479 | B2 | 10/2007 | Ljungdahl et al. |
| 7,399,255 | B1 | 7/2008 | Johnson et al. |
| 7,404,355 | B2 | 7/2008 | Viaud et al. |
| 7,416,068 | B2 | 8/2008 | Ray et al. |
| 7,454,252 | B2 | 11/2008 | El-Sayed |
| 7,464,526 | B2 | 12/2008 | Coenen |
| 7,505,819 | B2 | 3/2009 | El-Sayed |
| 7,530,091 | B2 | 5/2009 | Vaughan |
| 7,675,381 | B2 | 3/2010 | Lin |
| 7,742,777 | B2 | 6/2010 | Strater et al. |
| 2001/0016950 | A1 | 8/2001 | Matsuura |
| 2002/0141347 | A1 | 10/2002 | Harp et al. |
| 2002/0144292 | A1 | 10/2002 | Uemura et al. |
| 2002/0166124 | A1 | 11/2002 | Gurantz et al. |
| 2002/0174423 | A1 | 11/2002 | Fifield et al. |
| 2003/0084458 | A1 | 5/2003 | Ljungdahl et al. |
| 2004/0147273 | A1 | 7/2004 | Morphy |
| 2004/0172659 | A1 | 9/2004 | Ljungdahl et al. |
| 2004/0229561 | A1 | 11/2004 | Cowley et al. |
| 2004/0244053 | A1 | 12/2004 | Golombek |
| 2005/0034168 | A1 | 2/2005 | Beveridge |
| 2005/0047051 | A1 | 3/2005 | Marland |
| 2005/0144649 | A1 | 6/2005 | Bertonis et al. |
| 2005/0183130 | A1 | 8/2005 | Sadja et al. |
| 2005/0283815 | A1 | 12/2005 | Brooks et al. |
| 2005/0289632 | A1 | 12/2005 | Brooks et al. |
| 2006/0015921 | A1 | 1/2006 | Vaughan |
| 2006/0041918 | A9 | 2/2006 | Currivan et al. |
| 2006/0191359 | A1 | 8/2006 | Tarasinski et al. |
| 2006/0205442 | A1 | 9/2006 | Phillips et al. |
| 2006/0241838 | A1 | 10/2006 | Mongiardo et al. |
| 2006/0282871 | A1 | 12/2006 | Yo |
| 2007/0076746 | A1 | 4/2007 | Faska et al. |
| 2007/0288981 | A1 | 12/2007 | Mitsuse et al. |
| 2007/0288982 | A1 | 12/2007 | Donahue |
| 2008/0022344 | A1 | 1/2008 | Riggsby |
| 2008/0040764 | A1 | 2/2008 | Weinstein et al. |
| 2008/0120667 | A1 | 5/2008 | Zaltsman |
| 2008/0127287 | A1 | 5/2008 | Alkan et al. |
| 2008/0235750 | A1 | 9/2008 | Urbanek et al. |
| 2008/0247401 | A1 | 10/2008 | Bhal et al. |
| 2008/0247541 | A1 | 10/2008 | Cholas et al. |
| 2008/0271094 | A1 | 10/2008 | Kliger et al. |
| 2008/0313691 | A1 | 12/2008 | Cholas et al. |
| 2009/0031391 | A1 | 1/2009 | Urbanek |
| 2009/0047917 | A1 | 2/2009 | Phillips et al. |
| 2009/0077608 | A1 | 3/2009 | Romerein et al. |
| 2009/0113510 | A1 | 4/2009 | Knutson et al. |
| 2009/0165070 | A1 | 6/2009 | McMullin et al. |
| 2009/0180782 | A1 | 7/2009 | Bernard et al. |
| 2009/0320086 | A1 | 12/2009 | Rijssemus et al. |
| 2010/0017842 | A1 | 1/2010 | Wells |
| 2010/0095344 | A1 | 4/2010 | Newby et al. |
| 2010/0100918 | A1 | 4/2010 | Egan, Jr. et al. |
| 2010/0125877 | A1 | 5/2010 | Wells et al. |
| 2010/0146564 | A1 | 6/2010 | Halik et al. |
| 2010/0225813 | A1 | 9/2010 | Hirono et al. |
| 2011/0072472 | A1 | 3/2011 | Wells et al. |
| 2012/0054805 | A1 | 3/2012 | Shafer et al. |
| 2012/0054819 | A1 | 3/2012 | Alkan et al. |

FOREIGN PATENT DOCUMENTS

| | | | |
|---|---|---|---|
| JP | 55-132126 A | 10/1980 | |
| JP | 58-99913 | 12/1981 | |
| JP | 57-091055 A | 6/1982 | |
| JP | 58-101582 A | 6/1983 | |
| JP | 59026709 | 8/1984 | |
| JP | 61-157035 A | 7/1986 | |
| JP | 05-191416 A | 7/1993 | |
| JP | 07-038580 A | 2/1995 | |
| JP | 11-069334 A | 3/1999 | |
| JP | 2001-177580 A | 6/2001 | |
| JP | 2004-080483 | 3/2004 | |
| JP | 2005-005875 | 1/2005 | |
| JP | 2007-166109 A | 6/2007 | |
| JP | 2007-166110 A | 6/2007 | |
| WO | WO-0005895 A1 | 2/2000 | |
| WO | 0024124 A1 | 4/2000 | |
| WO | 0172005 A1 | 9/2001 | |
| WO | 0233969 A1 | 4/2002 | |
| WO | 02091676 A1 | 11/2002 | |
| WO | WO-2005062611 A1 | 7/2005 | |

OTHER PUBLICATIONS

PCT/US2010/049568 International Search Report May 31, 2011.

Egan, Multi-Port Entry Adapter, Hub and Method for Interfacing a CATV Network and a MoCA Network, U.S. Appl. No. 12/255,008, filed Oct. 21, 2008.

Wells, CATV Entry Adapter and Method for Preventing Interference with eMTA Equipment from MoCA Signals, U.S. Appl. No. 12/691,149, filed Jan. 21, 2010.

Halik, CATV Entry Adapter and Method Utilizing Directional Couplers for MoCA Signal Communication, U.S. Appl. No. 12/704,833, filed Feb. 12, 2010.
Newby, Ingress Noise Inhibiting Network Interface Device and Method for Cable Television Networks, U.S. Appl. No. 12/250,229, filed Oct. 13, 2008.
Egan, Multi-Port Entry Adapter, Hub and Method for Interfacing a CATV Network and a MoCA Network, U.S. Appl. No. 12/255,008, filed Oct. 21, 2008, Office Action Summary, dated Nov. 11, 2011.
Newby, Ingress Noise Inhibiting Network Interface Device and Method for Cable Television Networks, U.S. Appl. No. 12/250,229, filed Oct. 13, 2008, Office Action Summary, dated Jan. 23, 2012.
Wells, Passive Multi-Port Entry Adapter and Method for Preserving Downstream CATV Signal Strength within In-Home Network, U.S. Appl. No. 12/563,719, filed Sep. 21, 2009.
Wells, Passive Multi-Port Entry Adapter and Method for Preserving Downstream CATV Signal Strength within In-Home Network, U.S. Appl. No. 12/563,719, filed Sep. 21, 2009, Office Action Summary, dated Mar. 6, 2012.
Wells, Passive-Active Terminal Adapter and Method Having Automatic Return Loss Control, U.S. Appl. No. 12/175,366, filed Jul. 17, 2008.
Alkan, Home Network Frequency Conditioning Device and Method, U.S. Appl. No. 13/180,100, filed Jul. 11, 2011.
Safer, Home Network Frequency Conditioning Device, U.S. Appl. No. 13/178,149, filed Jul. 7, 2011.
Shafer, Low-Pass Filter Circuit, U.S. Appl. No. 13/167,497, filed Jun. 23, 2011.
Wells, Cable Television Entry Adapter, U.S. Appl. No. 13/245,510, filed Sep. 26, 2011.
Alkan, Method and Apparatus for Reducing Isolation in a Home Network, U.S. Appl. No. 13/333,060, filed Dec. 21, 2011.
Shafer, Upstream Bandwidth Conditioning Device, U.S. Appl. No. 12/760,153, filed Apr. 14, 2010.

BAND SELECTIVE ISOLATION BRIDGE FOR SPLITTER

FIELD OF THE INVENTION

This disclosure relates generally to the conveying of information along a transmission path and, more specifically, to a band selective isolation bridge for a splitter.

BACKGROUND OF THE INVENTION

In many data distribution networks, electrical signals conveying information propagate along transmission lines across distances and through splitting devices. For example, in a cable television (CATV) network, media content propagates downstream from a head-end facility toward media devices located in various facilities such as homes and businesses. Along the way, the electrical signals conveying the media content propagate along main trunks, through taps, and along multiple branches that ultimately distribute the content to drop cables at respective facilities. The drop cable, which may be a single coaxial cable, typically is connected to a splitting device having two or more outlet ports. Distribution cables connected to the outlet ports route the signals to various rooms, often extending to one or more media devices. The network of distribution cables, splitters, and distribution points is referred to as a drop system.

A typical data distribution network provides many content selections to a user's media devices within the drop system, such as one or more televisions equipped with set top boxes or cable modems. Content selection propagated on a downstream bandwidth of the CATV system may include broadcast television channels, video on demand services, internet data, home security services, and voice over internet (VOIP) services. The content selections are typically propagated in a discrete frequency range, or channel, that is distinct from the frequency ranges of other content selections. Downstream bandwidth includes frequencies typically ranging from 50-1,000 megahertz (MHz).

The typical data distribution network is a two-way communication system. The downstream bandwidth carries signals from the head end to the user and an upstream bandwidth carries upstream signals from the user to the head end. Upstream bandwidth may include data related to video on demand services, such as video requests and billing authorization; internet uploads, such as photo albums or user account information; security monitoring; or other services predicated on signals or data emanating from a subscriber's home. Upstream bandwidth frequencies typically range from 7-49 MHz.

A user data network, or home network, may be coupled to the cable television network via the same coaxial cable delivering the downstream and upstream bandwidth of the CATV system. Often, the user data network is a home entertainment network providing multiple streams of high definition video and entertainment. Examples of home networking technologies include Ethernet, HomePlug, HPNA, and 802.11n. In another example, the user data network may employ technology standards developed by the Multimedia over Coax Alliance (MoCA). The MoCA standards promote networking of personal data utilizing the existing coaxial cable that is wired throughout the user premises. MoCA technology provides the backbone for personal data networks of multiple wired and wireless products including voice, data, security, home heating/cooling, and video technologies. In such an arrangement, the cable drop from the cable system operator shares the coaxial line or network connection a MoCA-certified device such as a broadband router.

A MoCA-certified device such as the broadband router interconnects other MoCA-certified components located within the premises, for example additional set top boxes, routers and gateways, bridges, optical network terminals, computers, gaming systems, display devices, printers, network-attached storage, and home automation such as furnace settings and lighting control. The user data network allows distribution and sharing of entertainment content among the MoCA-connected devices. For example, a high definition program recorded on a set top box in the living room may be played back by a second set top box located in a bedroom. And, a high definition movie recorded on a camcorder and stored on a user's personal computer may be accessed and displayed through any of the set top boxes within the premises. The home network may also allow high-definition gaming between rooms.

The home network may utilize an open spectrum bandwidth on the coaxial cable to transmit the personal data content, such as entertainment content. For example, a cable system operator may utilize a bandwidth of frequencies up to 1002 MHz, and a satellite system operator may utilize a bandwidth of frequencies from 1550-2450 MHz. The unused range of frequencies in this example, or open spectrum bandwidth, is 1002-1550 MHz. In another example, the open spectrum bandwidth may be higher than 2450 MHz. In one particular example, the Multimedia over Coax Alliance specifies an open spectrum, or home network bandwidth, of 1125-1525 MHz. A home network utilizing the open spectrum bandwidth does not interfere with any of the bandwidth being utilized by the cable television services provider or a satellite services provider.

As may be appreciated, a home network utilizing coaxial cable must be able to pass signals backwards through a splitter in order to properly transmit the content room-to-room. However, coaxial splitters are essentially directional couplers designed to isolate splitter outputs and prevent signals from flowing room-to-room or outlet-to-outlet. The isolation was needed in CATV systems to reduce interference from other devices and maximize the power transfer from the point of entry to the outlets, so as to achieve the best television reception.

SUMMARY OF THE INVENTION

A splitter device having high isolation between output ports in the provider bandwidth and little or no isolation in the home network bandwidth is disclosed. In an aspect of the invention, the splitter device includes a first splitter comprising a provider content input port, a first output leg, and a second output leg. The provider content input port is configured to receive a downstream-propagating first bandwidth. The splitter device further includes a first conductive path coupled to the first output leg of the first splitter. The first conductive path is configured to propagate the provider bandwidth in a downstream direction towards a first user port. A second conductive path is coupled to the second output leg of the first splitter. The second conductive path is configured to propagate the provider bandwidth in the downstream direction towards a second user port. The splitter device further includes a bridge circuit operatively coupled between the first conductive path and the second conductive path. The bridge circuit is configured to propagate a home network bandwidth from the first user port to the second user port and isolate the provider bandwidth from the home network bandwidth.

In another aspect of the invention, the splitter device includes a first splitter comprising an input leg coupled to a provider content input port, a first output leg, and a second output leg. The provider content input port is configured to receive a downstream-propagating provider bandwidth. The splitter device further includes a first conductive path coupled to the first output leg of the first splitter, and a second conductive path coupled to the second output leg of the first splitter. The splitter device further includes a second splitter having an input leg coupled to a first user port, a first output leg coupled to the first conductive path, and a second output leg. The splitter device further includes a third splitter having an input leg coupled to a second user port, a first output leg coupled to the second conductive path, and a second output leg. The splitter device further includes a bridge circuit operatively coupled to the second output leg of the second splitter and the second output leg of the third splitter. The bridge circuit is configured to propagate a home network bandwidth from the first user port to the second user port and isolate the provider bandwidth from the home network bandwidth.

In another aspect of the invention, a splitter adapter is disclosed. The splitter adapter includes a first provider content input port configured to receive a provider bandwidth, and a second provider content input port configured to receive the provider bandwidth. The splitter adapter further includes a first splitter having an input leg coupled to a first user port, a first output leg coupled to the first provider content input port, and a second output leg. The splitter adapter further includes a second splitter having an input leg coupled to a second user port, a first output leg coupled to the second provider content input port, and a second output leg. The splitter adapter further includes a bridge circuit having an input and an output. The input of the bridge circuit is operatively coupled to the second output leg of the first splitter, and the output of the bridge circuit is operatively coupled to the second output leg of the second splitter. The bridge circuit is configured to attenuate the provider bandwidth and pass a home network bandwidth from the first user port to the second user port.

BRIEF DESCRIPTION OF THE DRAWINGS

For a further understanding of the invention, reference will be made to the following detailed description of the invention which is to be read in connection with the accompanying drawing, wherein.

DETAILED DESCRIPTION OF THE INVENTION

Figure 1:
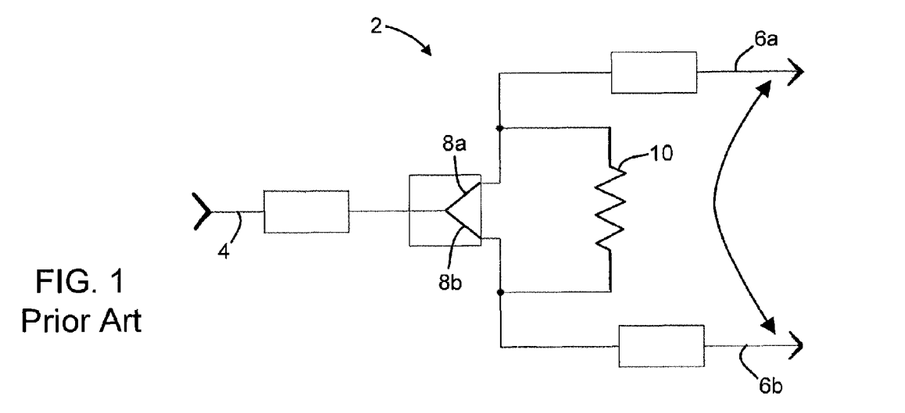
FIG. 1 schematically illustrates a prior art splitter device.

Splitters are used in distribution systems to divide an input signal into two or more output signals. Referring to FIG. 1, a typical splitter 2 includes an input port 4 and two or more output ports 6. A downstream bandwidth provided by a CATV system, for example, propagates through the input port 4 and exits from each of the respective output ports 6. Splitters have two important characteristics which determine the performance of the device: through-loss and isolation. Through-loss is the amount of attenuation the signal receives as it passes from input to output. Isolation refers to the ability to prevent a signal from appearing at a node in the circuit where it is unwanted. The two-port Wilkinson splitter 2 shown in FIG. 1 employs a quarter-wave transformer 8a, 8b on each output leg of the splitter. Isolation between each output is provided by an isolation element 10, such as a resistor. To provide optimal isolation, the resistor has a resistance value equal to twice the characteristic impedance of the input signal. Thus, for a CATV system having a 75-ohm characteristic impedance, the typical two-port Wilkinson splitter 2 will employ an isolation resistor 10 having a resistance value of 150 ohms, yielding a through-loss of about 3.5 dB from the input port 4 to each output port 6a, 6b, and an isolation between output ports 6a and 6b of about 20 dB.

Although a typical Wilkinson splitter provides adequate performance and isolation in many CATV systems, it suffers from drawbacks. One such problem is encountered when a home network is coupled to the CATV network over the same coaxial cable present within a structure or home premises. The home network utilizing coaxial cable must be able to pass signals backwards through a splitter in order to properly transmit data content room-to-room.

Figure 2:
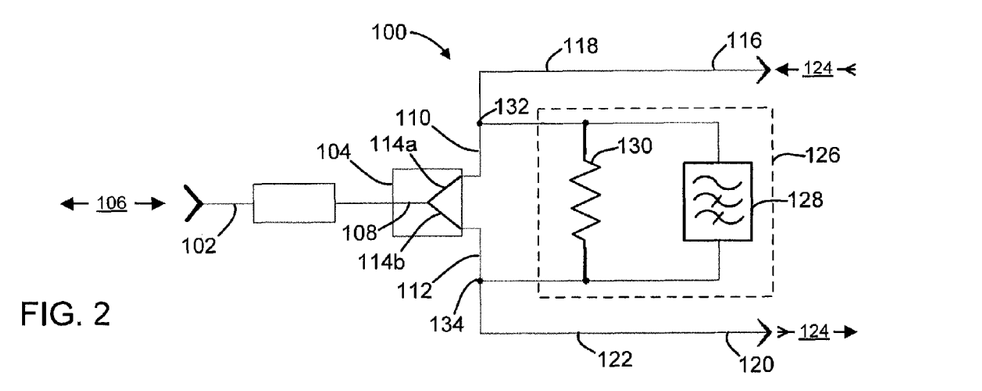
FIG. 2 schematically illustrates one embodiment of a splitter device in accordance with the present invention.

Referring to FIG. 2, a splitter device 100 includes a provider content input port 102 coupled to a splitter 104. In the disclosed embodiment, the provider content input port 102 is a standard female coaxial port configured to receive a downstream-propagating provider bandwidth 106, which may be a CATV system, for example. An exemplary CATV system carries downstream bandwidth in the 50-1,000 MHz range, and also carries an upstream bandwidth in the 7-49 MHz range, represented in FIG. 2 as arrows pointing in both directions.

The splitter 104, which may be a simple circuit, divides an input leg 108 into a first output leg 110 and a second output leg 112. The splitter 104 may include a splitter transformer 114 comprising windings 114a and 114b on each output leg, in one example. In another example, the transformer 114 may comprise a quarter-wave transmission line in the form of an integrated circuit micro-strip line on each output leg. The first output leg 110 is coupled to a first user port 116 via a first conductive path 118. Similarly, the second output leg 112 is coupled to a second user port 120 via a second conductive path 122. The first user port 116 and the second user port 120 may be configured [for set top boxes, etc.]

The splitter device 100 is adapted to freely transmit data on a home network bandwidth 124 from any port to any other port. For example, data on the home network bandwidth 124 may be transmitted from the first user port 116 to the second user port 120, or from the first user port 116 to the input port 102. Further, data on the home network bandwidth 124 may be transmitted from the second user port 120 to the first user port 116, or from the second user port 120 to the input port 102. In another example, such as when there are multiple splitters and the output of one is the input to another, data on the home network bandwidth 124 may be transmitted from the input port 102 to either of the first user port 116 or the second user port 120. The data may include voice transmission, security, home heating/cooling instructions, and high definition video technologies, for example. The home network bandwidth 124 occupies an open spectrum bandwidth, that is, in a frequency range outside the provider bandwidth 106. Referring to the exemplary CATV system above, the home network bandwidth 124 may carry signals in the 1125-1525 MHz range.

Band selective isolation for the splitter device 100 is provided by a band-selective isolation bridge circuit 126 operatively coupled between the first conductive path 118 and the second conductive path 122. In this manner, the provider bandwidth 106 is isolated from the first user port 116 to the second user port 120. In one embodiment, the bridge circuit 126 includes a high pass filter 128. The high pass filter 128 is configured to attenuate the CATV bandwidth 106 and pass the home network bandwidth 124. For example, the high pass filter 128 may block or attenuate frequencies below 1000 MHz, while passing frequencies above 1125 MHz. The splitter device 100 provides adequate isolation between the first user port 116 and the second user port 120 in the CATV bandwidth, while allowing signals to pass from the first user port 116 to the second user port 120 in the home network bandwidth 124. The bridge circuit 126 may further include an additional isolation element 130 such as a resistor disposed in parallel with the bridge circuit 126. The isolation element 130 provides isolation between the first conductive path 118 and second conductive path 122 when carrying the provider bandwidth 106.

In operation, signals transmitted in the provider bandwidth 106 enter the splitter device 100 through the input port 102 and propagate down either the first conductive path 118 or the second conductive path 122. Signals propagating down the first conductive path 118 pass through node 132 to the first user port 116. Signals passing down the alternate branch of node 132 are attenuated by high pass filter 128. Signals propagating down the second conductive path 122 pass through node 134 to the second user port 120. Signals passing down the alternate branch of node 134 are attenuated by high pass filter 128. Isolation between the first conductive path 118 and the second conductive path 122 in the provider bandwidth range of frequencies may be further provided by the isolation element 130.

In one example, signals in the home network bandwidth 124 enter the splitter device 100 through the first user port 116 and propagate down the first conductive path 118 to node 132. Signals propagating on the branch towards the provider content input port 102 are eventually attenuated as will be explained below. Signals propagating down the other branch of node 132 pass through the high pass filter 128 towards node 134 and out the second user port 120.

To prevent the home network bandwidth 124 from transmitting private content out the provider content input port 102 and upstream to the head end network, a low pass filter (not shown) may be disposed at the point of entry between the input port 102 and the user tap. The low pass filter is configured to attenuate the home network bandwidth 124 while passing the provider bandwidth 106.

In another embodiment, the low pass filter (not shown) may be integrated into the input port 102 and may be selectively activated. For example, a bypass leg including the low pass filter may be controlled by a switch. The switch may be manual, remote, or automatic with a detection feature. The switch could be used to attenuate the home network bandwidth 124 from being transmitted upstream (e.g., out the input port). This embodiment is useful when multiple splitter devices of the present invention are located throughout a household, but only one of them is required to block the home network bandwidth. A splitter device located at the point of entry is one example.

Figure 3:
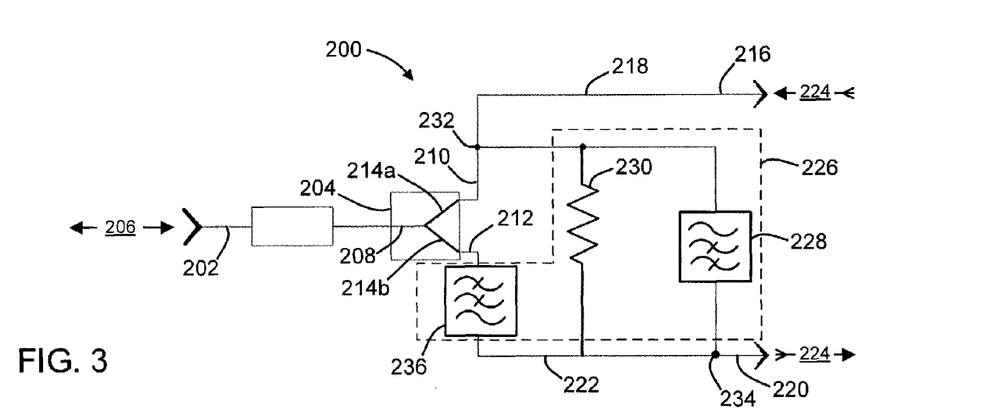
FIG. 3 schematically illustrates a second embodiment of a splitter device in accordance with the present invention.

Referring to FIG. 3, wherein like numerals indicate like elements from FIG. 2, another embodiment of a splitter device 200 includes a provider content input port 202 coupled to a splitter 204. The splitter 204 divides an input leg 208 into a first output leg 210 and a second output leg 212. Each output leg may include a first and second transformer winding 214a and 214b. The first output leg 210 is coupled to a first user port 216 via a first conductive path 218. Similarly, the second output leg 212 is coupled to a second user port 220 via a second conductive path 222.

Band selective isolation for the splitter device 200 is provided by a band-selective isolation bridge circuit 226 operatively coupled between the first conductive path 218 and the second conductive path 222. In the illustrated embodiment, the bridge circuit 226 includes a high pass filter 228 configured to attenuate a CATV bandwidth 206 and pass a home network bandwidth 224. The band-selective isolation bridge circuit 226 further includes an additional isolation element 230 such as a resistor disposed in parallel with the bridge circuit 126.

In contrast to the splitter device 100 illustrated in FIG. 2, the bridge circuit 226 depicted in FIG. 3 further includes a low pass filter 236 operatively coupled to the second conductive path 222. In the illustrated embodiment, the low pass filter 236 is disposed between the second output leg 212 of the splitter 204 and the junction or node 238 where the isolation element 230 joins the second conductive path 222. The low pass filter 236 is configured to pass the provider bandwidth 206 and attenuate the home network bandwidth 224.

In operation, signals transmitted in the provider bandwidth 206 enter the splitter device 200 through the input port 202 and propagate down either the first conductive path 218 or the second conductive path 222. Signals propagating down the first conductive path 218 pass through node 232 to the first user port 216. Signals passing down the alternate branch of node 232 are attenuated by high pass filter 228. Signals propagating down the second conductive path 222 pass through the low pass filter 236 and node 234 to the second user port 220. Signals passing down the alternate branch of node 234 are attenuated by high pass filter 228. Isolation between the first conductive path 218 and the second conductive path 222 in the provider bandwidth range of frequencies may be further provided by the isolation element 230.

In one example, signals in the home network bandwidth 224 enter the splitter device 200 through the first user port 216 and propagate down the first conductive path 218 to node 232. Signals propagating on the branch towards the provider content input port 202 are eventually attenuated as explained above. Signals propagating down the other branch of node 232 pass through the high pass filter 228 towards node 234 and out the second user port 220. Signals propagating down the other branch of node 234 are attenuated by the low pass filter 236.

Figure 4:
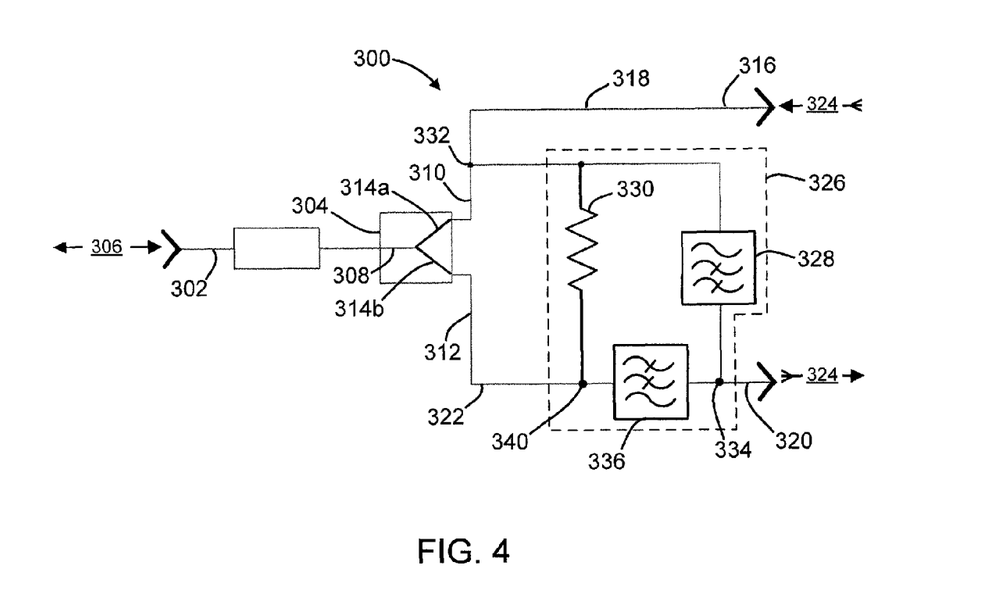
FIG. 4 schematically illustrates a third embodiment of a splitter device in accordance with the present invention.

Referring to FIG. 4, wherein like numerals indicate like elements from FIGS. 2 and 3, another embodiment of a splitter device 300 includes a provider content input port 302 coupled to a splitter 304. The splitter 304 divides an input leg 308 into a first output leg 310 and a second output leg 312. Each output leg may include a first and second transformer winding 314a and 314b. The first output leg 310 is coupled to a first user port 316 via a first conductive path 318. Similarly, the second output leg 312 is coupled to a second user port 320 via a second conductive path 322.

Band selective isolation for the splitter device 300 is provided by a band-selective isolation bridge circuit 326 operatively coupled between the first conductive path 318 and the second conductive path 322. In the illustrated embodiment, the bridge circuit 326 includes a high pass filter 328 configured to attenuate a CATV bandwidth 306 and pass a home network bandwidth 324. The band-selective isolation bridge circuit 326 further includes an additional isolation element 330 such as a resistor disposed in parallel with the bridge circuit 326.

In contrast to the splitter device 200 illustrated in FIG. 3, the bridge circuit 326 depicted in FIG. 3 further includes a low pass filter 336 operatively coupled to the second conductive path 322 between isolation element 330 and a high pass filter 328.

In operation, signals transmitted in the provider bandwidth 306 enter the splitter device 300 through the input port 302 and propagate down either the first conductive path 318 or the second conductive path 322. Signals propagating down the first conductive path 318 pass through node 332 to the first user port 316. Signals passing down the alternate branch of node 332 are attenuated by high pass filter 328. Signals propagating down the second conductive path 322 pass through the low pass filter 336 and node 334 to the second user port 320. Signals passing down the alternate branch of node 334 are attenuated by high pass filter 328.

In one example, signals in the home network bandwidth 324 enter the splitter device 300 through the first user port 316 and propagate down the first conductive path 318 to node 332. Signals propagating on the branch towards the provider content input port 302 are eventually attenuated as explained above. Signals propagating down the other branch of node 332 pass through the high pass filter 328 towards node 334 and out the second user port 320. Signals propagating down the other branch of node 334 are attenuated by the low pass filter 336. In this embodiment, band selective isolation is provided by blocking both the second conductive path 322 and the isolation element 330 from the home network bandwidth 324.

Figure 5:
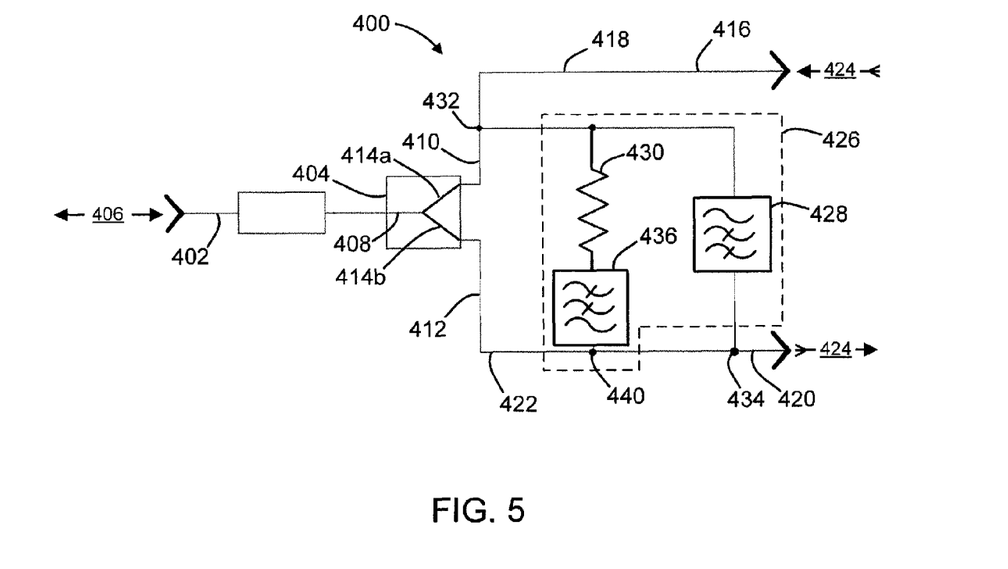
FIG. 5 schematically illustrates a fourth embodiment of a splitter device in accordance with the present invention.

Referring to FIG. 5, wherein like numerals indicate like elements from FIG. 4, another embodiment of a splitter device 400 includes a provider content input port 402 coupled to a splitter 404. The splitter 404 divides an input leg 408 into a first output leg 410 and a second output leg 412. Each output leg may include a first and second transformer winding 414a and 414b. The first output leg 410 is coupled to a first user port 416 via a first conductive path 418. Similarly, the second output leg 412 is coupled to a second user port 420 via a second conductive path 422.

Band selective isolation for the splitter device 400 is provided by a band-selective isolation bridge circuit 426 operatively coupled between the first conductive path 418 and the second conductive path 422. In the illustrated embodiment, the bridge circuit 426 includes a high pass filter 428 configured to attenuate a CATV bandwidth 406 and pass a home network bandwidth 424. The band-selective isolation bridge circuit 426 further includes an additional isolation element 430, such as a resistor, and a low pass filter 436 disposed in parallel with the bridge circuit 426.

In operation, signals transmitted in the provider bandwidth 406 enter the splitter device 400 through the input port 402 and propagate down either the first conductive path 418 or the second conductive path 422. Signals propagating down the first conductive path 418 pass through node 432 to the first user port 416. Signals passing down the alternate branch of node 432 are attenuated by high pass filter 428. Signals propagating down the second conductive path 422 pass through node 440 and node 434 to the second user port 420. Signals passing down the alternate branch of node 434 are attenuated by the high pass filter 428.

In one example, signals in the home network bandwidth 424 enter the splitter device 400 through the first user port 416 and propagate down the first conductive path 418 to node 432. Signals propagating on the branch towards the provider content input port 402 are eventually attenuated as explained above. Signals propagating down the other branch of node 432 pass through the high pass filter 428 towards node 434 and out the second user port 420. Signals propagating down the other branch of node 434 pass up the second conductive path 422 to third node 440, and are either attenuated by the low pass filter 436 or the low pass filter disposed between the input port 402 and the user tap.

In another example, the embodiments of the bridge circuit described above may be combined. For example, the location of the low pass filter 236 illustrated in FIG. 3 may be combined with the location of the low pass filter 436 illustrated in FIG. 5. In this manner, two low pass filters are provided and the home network bandwidth will be attenuated on the second conductive path and on the leg comprising the isolation element.

Figure 6:
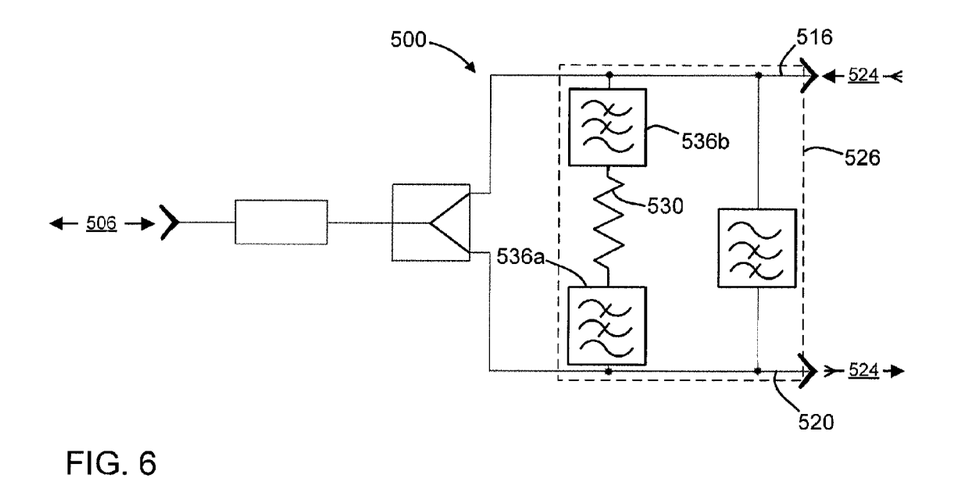
FIG. 6 schematically illustrates a fifth embodiment of a splitter device in accordance with the present invention.

Referring to FIG. 6, another embodiment of a splitter device 500 includes a bridge circuit 526 that utilizes component symmetry to ensure equal circuit performance whether the home network bandwidth is entering the splitter device from the first user port 516 or the second user port 520. In one example, the circuit illustrated in FIG. 5 is modified to include a second low pass filter 536b disposed symmetric along the leg comprising the isolation element 530 opposite the first low pass filter 536a. In operation, a home network bandwidth 524 entering from either port 516 or port 520 will be attenuated prior to reaching the isolation element 530.

Figure 7:
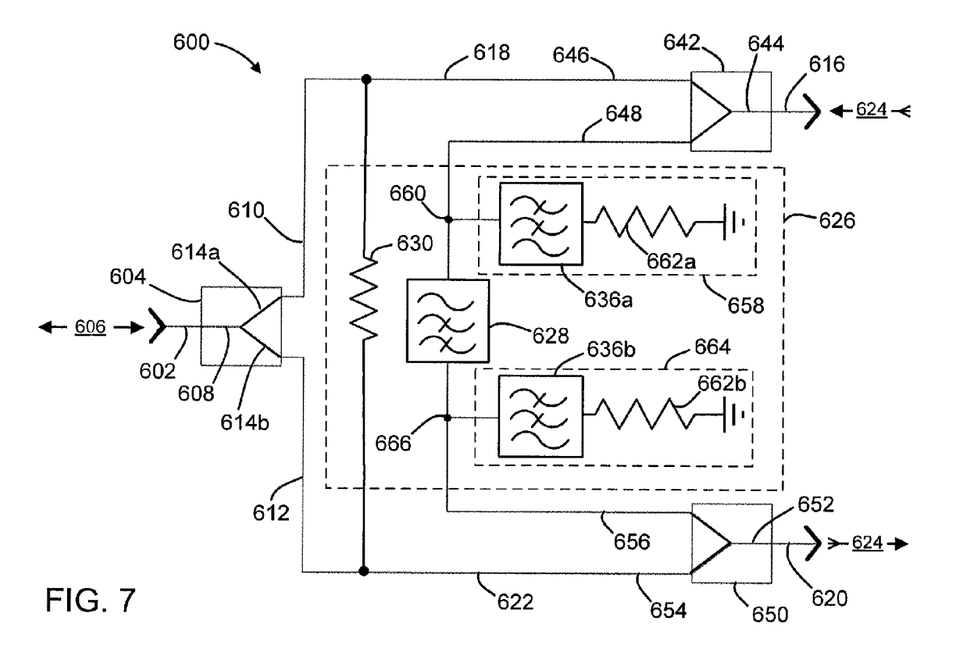
FIG. 7 schematically illustrates a sixth embodiment of a splitter device in accordance with the present invention.

Although the splitter devices described above are adequate in many applications, non-flat insertion losses and poor return losses may be present at the ports. To alleviate these potential problems, another embodiment of a splitter device 600 of the present invention is illustrated in FIG. 7, wherein like numerals indicate like elements. The splitter device 600 includes a provider content input port 602 coupled to a first splitter 604. The first splitter 604 divides an input leg 608 into a first output leg 610 and a second output leg 612. Each output leg may include a first and second transformer winding 614a and 614b. The first output leg 610 is coupled to a first user port 616 via a first conductive path 618. The first user port 616 includes a second splitter 642. An input leg 644 of the second splitter 642 splits a home network bandwidth 624 entering through the first user port 616 into a first output leg 646 and a second output leg 648. The first output leg 646 of the second splitter 642 is coupled to the first conductive path 618, and the second output leg 648 is coupled to a bridge circuit 626, as will be explained below.

The second output leg 612 of the first splitter 604 is coupled to a second user port 620 via a second conductive path 622. The second user port 620 includes a third splitter 650 having an input leg 652 and two output legs 654, 656. The first output leg 654 is coupled to the second conductive path 622, and the second output leg 656 is coupled to the bridge circuit 626.

The bridge circuit 626 includes a high pass filter 628 operatively coupled to the second output leg 648 of the second splitter 642 and the second output leg 656 of the third splitter 650. The bridge circuit 626 further includes a first ground path element 658 coupled to the second output leg 648 of the second splitter 642 at node 660. In the disclosed embodiment, the first ground path element 658 directs the provider bandwidth 606 to ground and prevents reflections from the high pass filter 628 to the provider bandwidth 606. The first ground path element 658 includes a low pass filter 636a and a termination resistor 662a. The low pass filter 636a is configured pass the provider bandwidth 606 and attenuate the home network bandwidth 624. The termination resistor 662 may be configured to match the impedance of the line load so as to prevent reflections due to impedance mismatch. In the illustrated example, the line load is 75 ohms, and the termination resistor 662 is likewise 75 ohms. The bridge circuit 626 further includes a second ground path element 664 coupled to the second output leg 656 of the third splitter 650 at node 666. In the illustrated example, the second ground path element 664 includes a low pass filter 636b and a termination resistor 662b. The second ground path element 664 is symmetric to the first ground path element 658.

The bridge circuit 626 may further include an isolation element 630 such as a resistor disposed in parallel with the bridge circuit 626. The isolation element 630 provides isolation between the first conductive path 618 and second conductive path 622 when carrying the provider bandwidth 606.

In operation, signals transmitted in the provider bandwidth 606 enter the splitter device 600 through the input port 602 and propagate down either the first conductive path 618 or the second conductive path 622. Signals propagating down the first conductive path 618 enter the second splitter 642 through the first output leg 646 and exit the first user port 616. Should any of the provider bandwidth 606 propagate down the second output leg 648, it is attenuated at the high pass filter 628 or routed to ground through the first ground path element 658. Similarly, signals propagating down the second conductive path 622 enter the third splitter 650 through the first output leg 654 and exit the second user port 620. Should any of the provider bandwidth 606 propagate down the second output leg 656, it is attenuated at the high pass filter 628 or routed to ground through the first ground path element 664.

Provider bandwidth 606 propagating upstream, such as upstream bandwidth in the 7-49 MHz frequency range, may enter the second splitter 642 at the first user port 616 and travel up the first output leg 646 and out the provider content input port 602. Upstream bandwidth propagating along the second output leg 648 is attenuated at the high pass filter 628 or routed to ground through the first ground path element 658.

In one example, signals in the home network bandwidth 624 enter the splitter device 600 through the second splitter 642 at the first user port 616 and propagate through the high pass filter 628, through the second output leg 656 of the third splitter 650, and out the second user port 620. Signals in the home network bandwidth 624 propagating up the first output leg 646 of the second splitter 642, or propagating up the first output leg 654 of the third splitter 650, pass out the provider content input port 602 and are attenuated by the low pass filter (not shown) disposed between the input port and the user tap.

Figure 8:
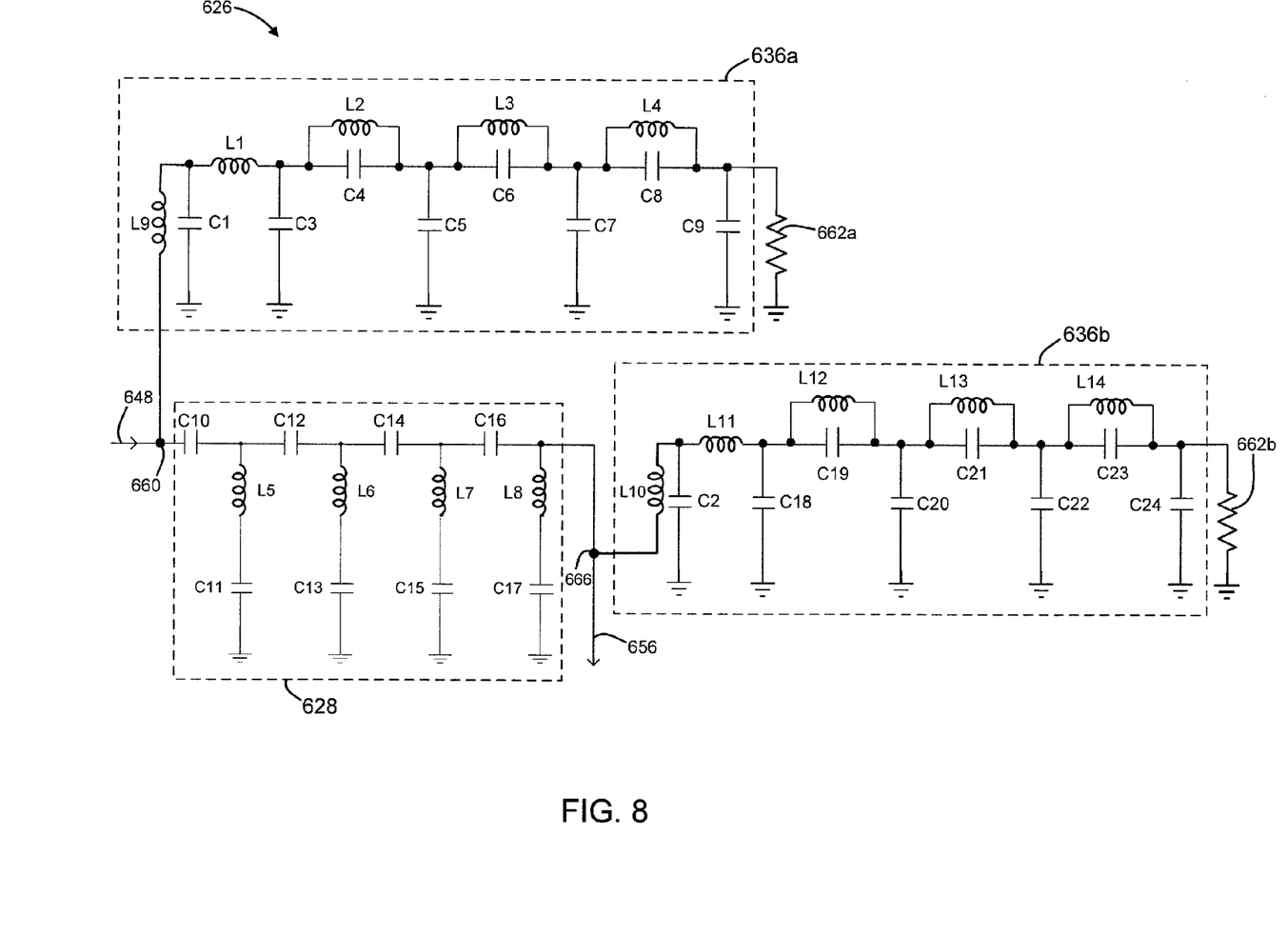
FIG. 8 is an electrical schematic of the embodiment of the splitter device shown in FIG. 7.

Referring to FIG. 8, shown is one possible topology for the bridge circuit 626 of the splitter device 600. The low pass filter 636a is a hybrid parallel LC arrangement in which inductors L9 and L1 along with capacitors C1 and C3 increase the isolation between the low pass filter(s) and the high pass filter 628. L2/C4, L3/C6, L4/C8 and capacitors C5, C7, and C9 collectively form an elliptic filter. Other filter designs, such as Butterworth or Chebyshev, are equally operable but may require additional components to implement. The low pass filter 636b is symmetric to filter 636a. That is, inductors L10 and L11 along with capacitors C2 and C18 increase the isolation between the low pass filter(s) and the high pass filter 628, while L12/C19, L13/C21, L14/C23 and capacitors C20, C22, and C24 collectively form an elliptic filter. High pass filter 628 includes capacitors C10, C11, C12, C13, C14, C15, C16 and C17 and inductors L5, L6, L7, and L8 to form a filter path that passes signals in the frequency range of the home network bandwidth (e.g., 1125 to 1525 MHz). Capacitors C10, C12, C14 and C16 are connected in series between the input path and output path. Series connections of L5/C11, L6/C13, L7/C15 and L8/C17 connect to ground the node between C10 and C12, the node between C12 and C14, the node between C14 and C16, and the node between C16 and node 666, respectively. This filter is an operable embodiment, but other filter designs are operable with the present invention as well.

The schematic of FIG. 8 is approximately symmetric in either direction, although individual component values need not be symmetric. Symmetry is not necessary to the present invention, but has the advantage of symmetric return loss at the input port and the output port as a function of frequency.

Figure 9:
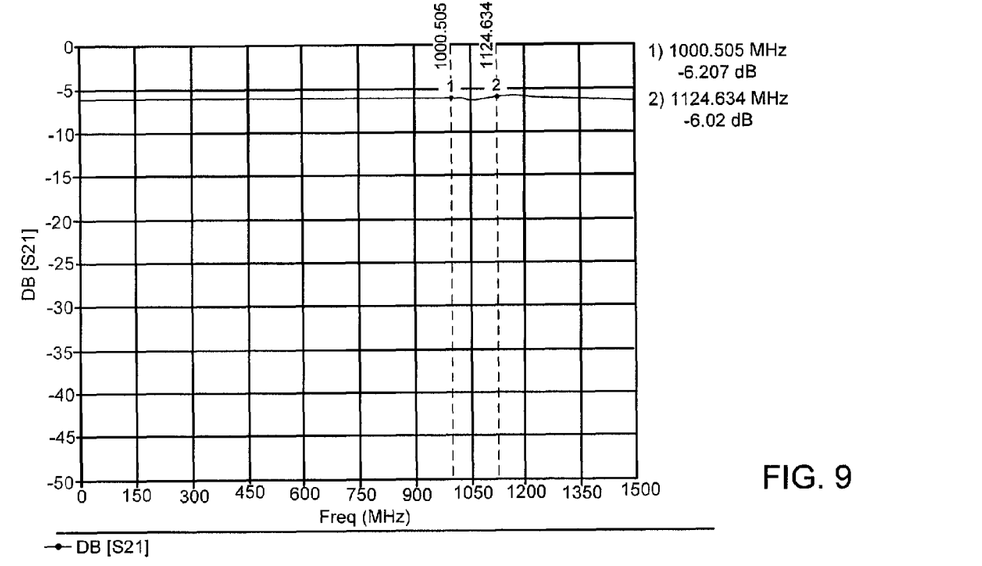
FIG. 9 is a diagram of the insertion loss of a splitter device in accordance with one embodiment of the present invention, as a function of frequency.
Figure 10:
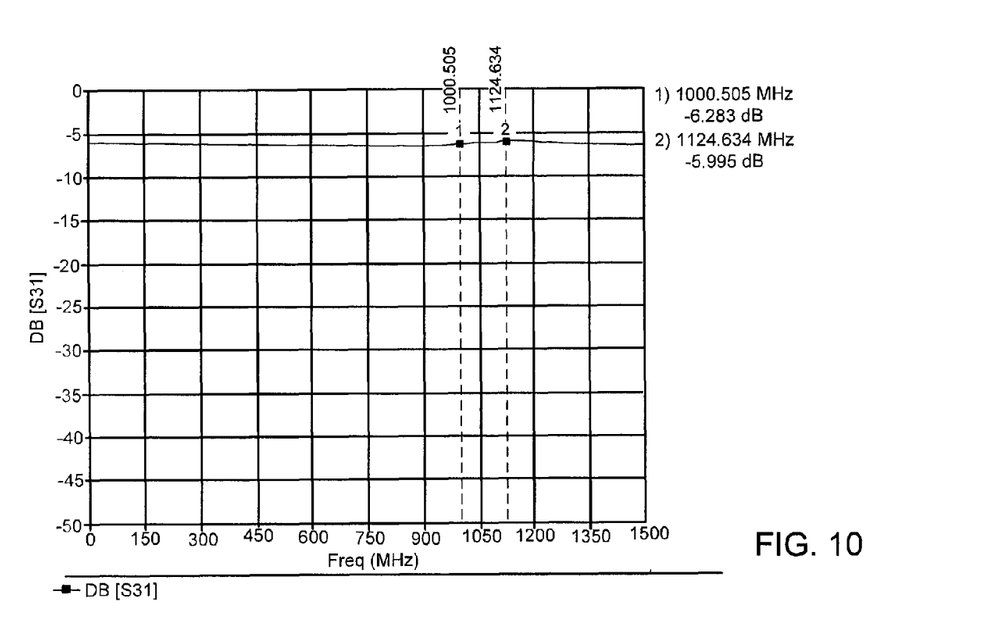
FIG. 10 is a another diagram of the insertion loss of the splitter device of FIG. 9.

The embodiment of FIG. 8 is designed to minimize insertion losses and maintain a return loss with a magnitude greater than 25 dB in all frequency regions for which signals of interest are transmitted. Return loss in the transition portions of the frequency response, in which no information is contained, may not be significant. FIG. 9 plots the insertion loss from the provider content input port 602 to the first user port 616 as a function of frequency. The insertion loss is less than 7 dB. Similarly, FIG. 10 plots the insertion loss from the provider content input port 602 to the second user port 620, and the insertion loss is less than 7 dB.

Figure 11:
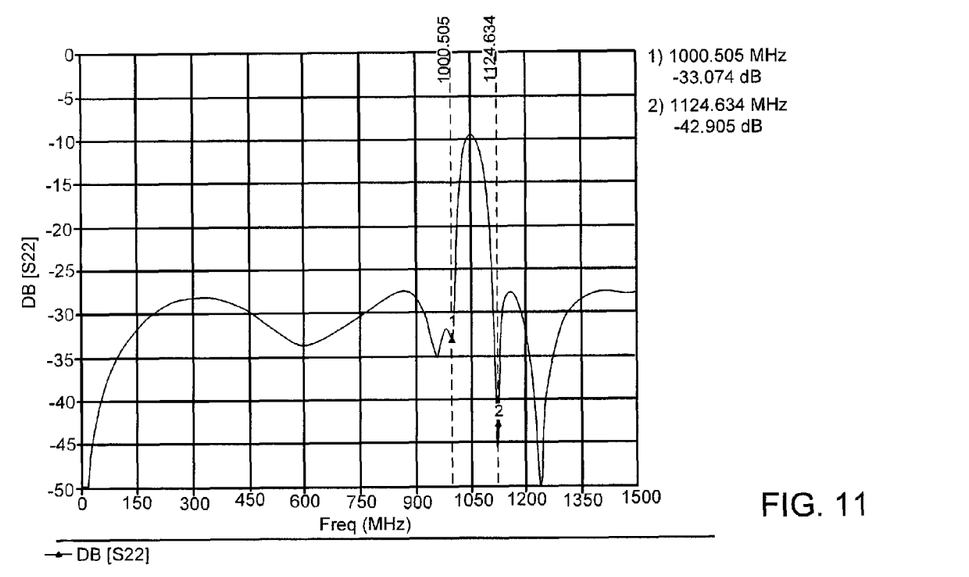
FIG. 11 is a diagram of the return loss of a splitter device in accordance with one embodiment of the present invention, as a function of frequency.
Figure 12:
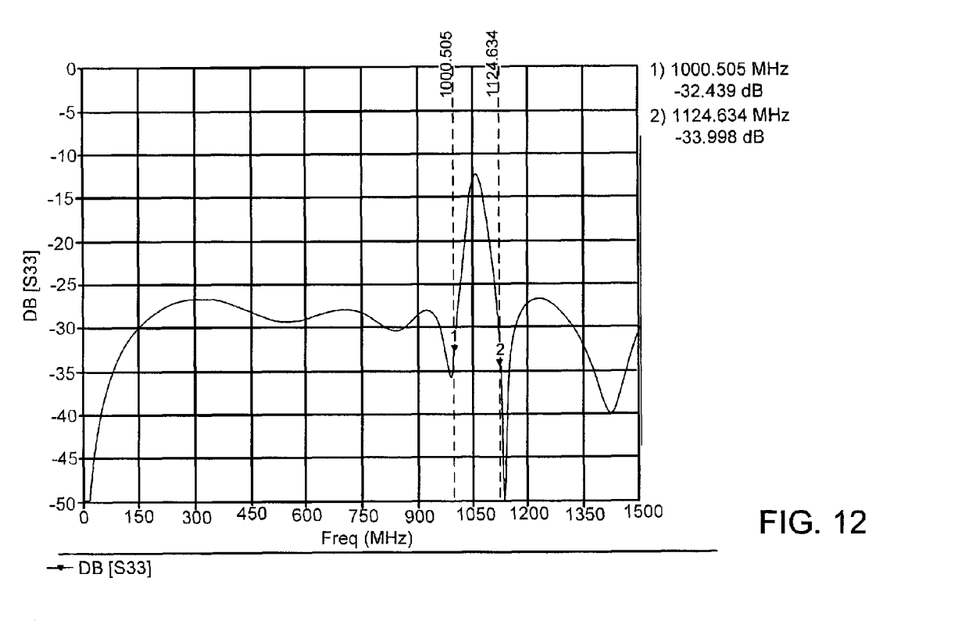
FIG. 12 is another diagram of the return loss of the splitter device of FIG. 11.

FIG. 11 plots the return loss at the first user port 616 as a function of frequency. The return loss is greater than 25 dB for the provider bandwidth 606 (e.g., 5 to 1000.5 MHz) and the home network bandwidth 624 (e.g., frequencies greater than 1125 MHz). Similarly, FIG. 12 plots the return loss at the second user port 620. The return loss is greater than 25 dB for the provider bandwidth 606 and the home network bandwidth 624.

Figure 13:
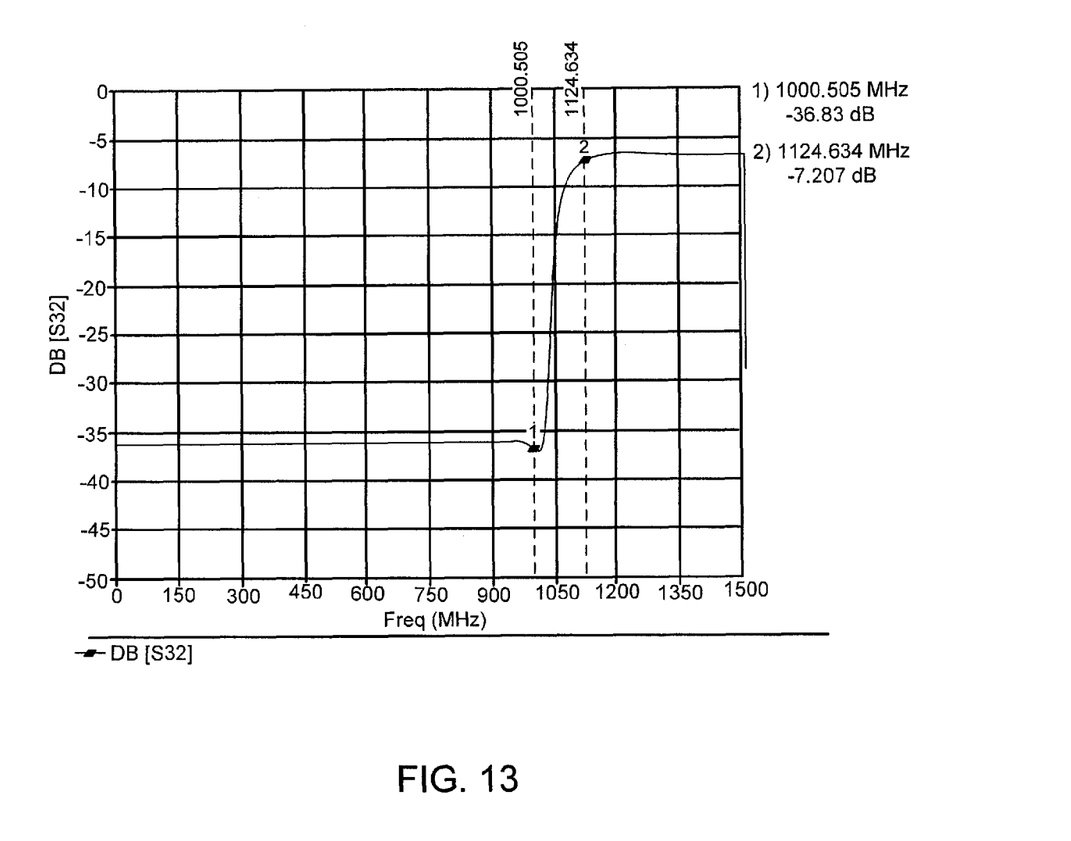
FIG. 13 is a diagram of the isolation between ports of a splitter device in accordance with one embodiment of the present invention, as a function of frequency.

FIG. 13 plots the insertion loss from the first user port 616 to the second user port 620 as a function of frequency to illustrate the isolation between the two ports. Isolation in the provider bandwidth 606 is very high; greater than 35 dB below 1000.5 MHz. Conversely, isolation in the home network bandwidth 624 (e.g., 1125 to 1525 MHz) is quite low; less than approximately 7 dB.

Figure 14:
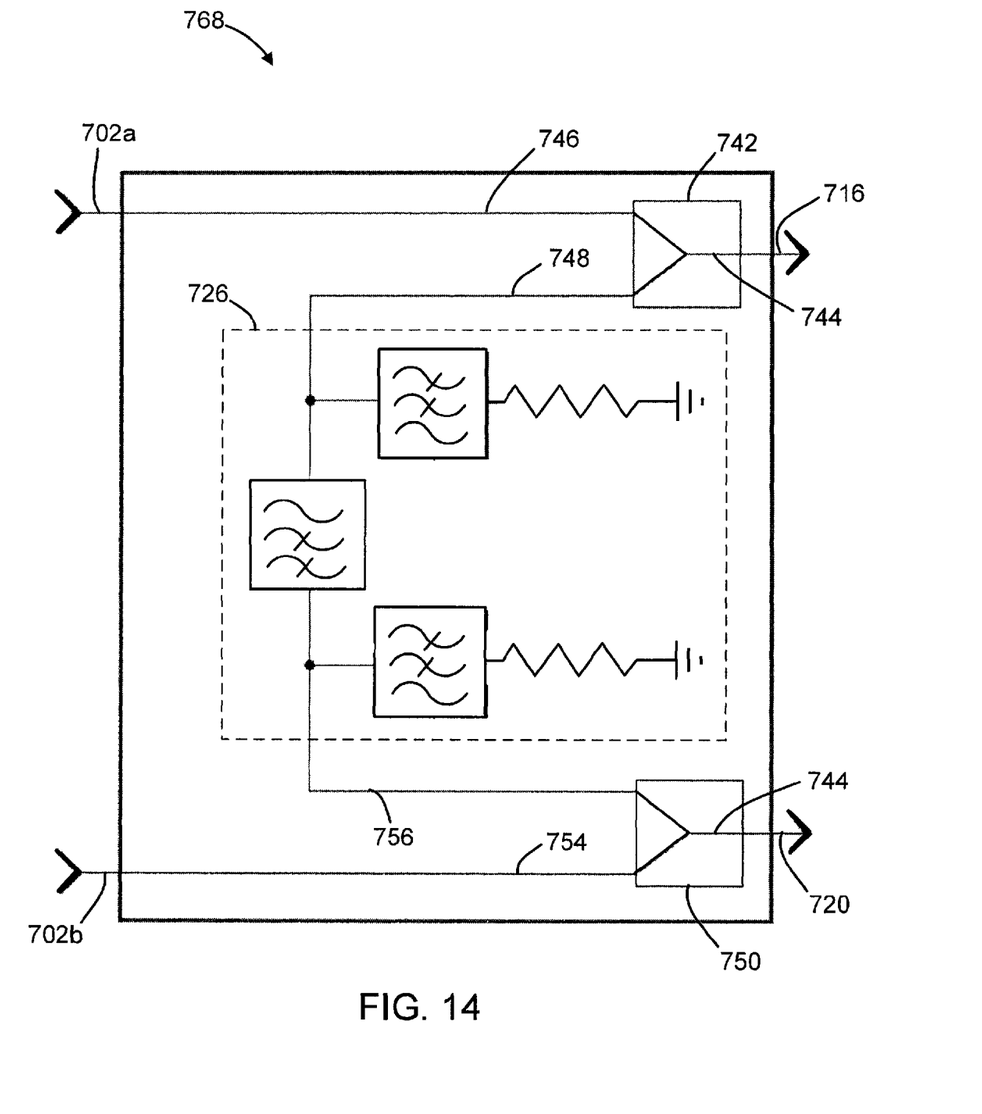
FIG. 14 schematically illustrates a seventh embodiment of a splitter device in accordance with the present invention.

Referring to FIG. 14, in another embodiment a bridge circuit 726 of the present invention may be used as a splitter adapter 768. In one example, the splitter adapter 768 includes two provider content input ports 702a, 702b to mate with the output of a standard coaxial cable splitter device (not shown). The splitter adapter 768 includes a first and second user ports 716 and 720, respectively. The first user port 716 includes a first splitter 742 and the second user port 720 includes a second splitter 750, as described in the embodiment illustrated in FIG. 7. The first splitter 742 includes an input leg 744 coupled to the first user port 716, and two output legs 746, 748. The first output leg 746 is coupled to the provider content input port 702a, and the second output leg 748 is coupled to the input of the bridge circuit 726.

The second splitter 750 includes an input leg 744 coupled to the second user port 720, and two output legs 754, 756. The first output leg 754 is coupled to the provider content input port 702b, and the second output leg 756 is coupled to the output of the bridge circuit 726. The bridge circuit 726 may be arranged as described with reference to FIGS. 7 and 8.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. For example, although a two-way splitter is disclosed in the above description, a four-way or eight-way splitter is also contemplated within the scope of the invention. Although specific terms are employed herein, they are used in a generic and descriptive sense only and not for purposes of limitation.

We claim:

1. A splitter device comprising:
   a first splitter comprising a provider content input port, a first output leg, and a second output leg, the provider content input port configured to receive a downstream-propagating first bandwidth;
   a first conductive path coupled to the first output leg of the first splitter, the first conductive path configured to propagate the provider bandwidth in a downstream direction towards a first user port;
   a second conductive path coupled to the second output leg of the first splitter, the second conductive path configured to propagate a provider bandwidth in the downstream direction towards a second user port; and
   a bridge circuit operatively coupled between the first conductive path and the second conductive path, the bridge circuit configured to propagate a home network bandwidth from the first user port to the second user port and isolate the provider bandwidth from the first user port to the second user port.

2. The splitter device of claim 1, wherein the bridge circuit comprises a first band pass filter configured to attenuate the provider bandwidth and pass the home network bandwidth.

3. The splitter device of claim 2, further comprising an isolation element disposed in parallel with the bridge circuit.

4. The splitter device of claim 3, wherein the provider bandwidth has a characteristic impedance of 75 ohms, and the isolation element is a resistor having a resistance value of about 150 ohms.

5. The splitter device of claim 3, further comprising a second band pass filter disposed in series with the isolation element, the second band pass filter configured to pass the provider bandwidth and attenuate the home network bandwidth.

6. The splitter device of claim 5, further comprising a third band pass filter operatively coupled to the second conductive path, the third band pass filter configured to pass the provider bandwidth and attenuate the home network bandwidth.

7. The splitter device of claim 3, further comprising a plurality of second band pass filters disposed in electrical series with the isolation element, at least one second band pass filter arranged on either side of the isolation element.

8. The splitter device of claim 2, further comprising a second band pass filter operatively coupled to the second conductive path, the second band pass filter configured to pass the provider bandwidth and attenuate the home network bandwidth.

9. The splitter device of claim 8, wherein the second band pass filter is further configured to attenuate the home network bandwidth from the isolation resistor.

10. The splitter device of claim 1, wherein the provider bandwidth is provided by a provider group.

11. The splitter device of claim 10, wherein the provider group is selected from the group consisting of a cable provider, a satellite provider, and a telecommunications provider.

12. The splitter device of claim 11, wherein the provider bandwidth comprises a frequency range of 5 to 1000 megahertz.

13. The splitter device of claim 1, wherein the home network bandwidth is provided by an end user.

14. The splitter device of claim 13, wherein the home network bandwidth is selected from the group consisting of Ethernet, HomePlug, HPNA, 802.11n, and MoCA.

15. A splitter device comprising: a first splitter comprising an input leg coupled to a provider content input port, a first output leg, and a second output leg, the provider content input port configured to receive a downstream-propagating provider bandwidth;
   a first conductive path coupled to the first output leg of the first splitter;
   a second conductive path coupled to the second output leg of the first splitter;
   a second splitter having an input leg coupled to a first user port, a first output leg coupled to the first conductive path, and a second output leg; a third splitter having an input leg coupled to a second user port, a first output leg coupled to the second conductive path, and a second output leg; and
   a bridge circuit operatively coupled to the second output leg of the second splitter and the second output leg of the third splitter, the bridge circuit configured to propagate a home network bandwidth from the first user port to the second user port and isolate the provider bandwidth from the first user port to the second user port.

16. The splitter device of claim 15, wherein the bridge circuit comprises a first band pass filter and a first ground path element, the first ground path element operatively coupled between the second output leg of the second splitter and the first band pass filter.

17. The splitter device of claim 16, wherein the first band pass filter is a high pass filter.

18. The splitter device of claim 16, further comprising a second ground path element operatively coupled between the second output leg of the third splitter and the first band pass filter.

19. The splitter device of claim 16, wherein the first ground path element comprises a second band pass filter disposed in series with a termination resistor.

20. The splitter device of claim 19, wherein the second band pass filter is configured to pass the provider bandwidth and attenuate the home network bandwidth.

21. The splitter device of claim 20, wherein the second band pass filter is a low pass filter.

22. The splitter device of claim 19, wherein the provider bandwidth has a characteristic impedance of 75 ohms, and the termination resistor has a resistance value of about 75 ohms.

23. The splitter device of claim 15, wherein the provider bandwidth is provided by a provider group selected from the group consisting of a cable provider, a satellite provider, and a telecommunications provider.

24. The splitter device of claim 15, wherein the provider bandwidth comprises a frequency range of 5 megahertz to 1002 megahertz.

25. The splitter device of claim 15, wherein the home network bandwidth is provided by an end user, and is selected from the group consisting of Ethernet, HomePlug, HPNA, 802.11n, and MoCA.

26. A splitter adapter comprising:
a first provider content input port configured to receive a provider bandwidth;
a second provider content input port configured to receive the provider bandwidth;
a first splitter having an input leg coupled to a first user port, a first output leg coupled to the first provider content input port, and a second output leg;
a second splitter having an input leg coupled to a second user port, a first output leg coupled to the second provider content input port, and a second output leg; and
a bridge circuit having an input and an output, the input of the bridge circuit operatively coupled to the second output leg of the first splitter, the output of the bridge circuit operatively coupled to the second output leg of the second splitter, the bridge circuit configured to attenuate the provider bandwidth and pass a home network bandwidth from the first user port to the second user port.

27. The splitter adapter of claim 26, wherein the bridge circuit comprises a first band pass filter, a first ground path element, and a second ground path element, the first ground path element operatively coupled between the second output leg of the first splitter and the input of the first band pass filter, the second ground path element coupled between the second output leg of the second splitter and the output of the first band pass filter.

28. The splitter adapter of claim 27, wherein the first band pass filter is a high pass filter.

29. The splitter adapter of claim 28, wherein the high pass filter attenuates provider bandwidth in a frequency range of 5 to 1000 megahertz.

30. The splitter adapter of claim 27, wherein the first ground path element comprises a second band pass filter disposed in series with a termination resistor.

31. The splitter adapter of claim 30, wherein the second band pass filter is a low pass filter.

32. The splitter adapter of claim 31, wherein the low pass filter passes provider bandwidth in a frequency range of 5 to 1000 megahertz.

* * * * *